(12) United States Patent
Saino

(10) Patent No.: US 6,708,990 B1
(45) Date of Patent: Mar. 23, 2004

(54) METHOD AND DEVICE FOR TRANSPORTING A CONTAINER HAVING A THREADED FITTING

(76) Inventor: Robert Saino, 1901 NW. 2$^{nd}$ St., Fort Lauderdale, FL (US) 33101

( * ) Notice: Subject to any disclaimer, the term of this patent is extended or adjusted under 35 U.S.C. 154(b) by 0 days.

(21) Appl. No.: 09/481,816

(22) Filed: Jan. 11, 2000

(51) Int. Cl.$^7$ ................................................ B62B 1/16
(52) U.S. Cl. ............... 280/47.24; 280/79.5; 280/47.315
(58) Field of Search .............................. 16/422; 294/15, 294/27.1; 280/35, 47.24, 47.17, 47.26, 79.5, 63, 47.315; 220/756, 759, 581, 582

(56) References Cited

U.S. PATENT DOCUMENTS

| | | | |
|---|---|---|---|
| 1,437,252 A | * 11/1922 | Kinnarid ...................... | 16/422 |
| 1,863,958 A | * 6/1932 | Wulff et al. ................. | 220/582 |
| 2,421,460 A | * 6/1947 | Merker et al. ............... | 220/581 |
| 2,661,113 A | * 12/1953 | Benson ........................ | 220/582 |
| 2,904,345 A | * 9/1959 | Bradley ..................... | 280/47.26 |
| 3,191,819 A | * 6/1965 | Smith .......................... | 220/582 |
| 3,334,910 A | * 8/1967 | Wilson et al. ................. | 280/35 |
| 3,556,577 A | * 1/1971 | Brasseur ....................... | 16/422 |
| 4,135,725 A | * 1/1979 | DiRoma .................. | 280/47.26 |
| 4,544,173 A | 10/1985 | Kellermyer | |
| 4,582,217 A | * 4/1986 | Proctor et al. .............. | 220/581 |
| 4,726,597 A | 2/1988 | Hickin | |
| 4,842,158 A | * 6/1989 | Reyes, Jr. .................... | 220/759 |
| 4,861,050 A | * 8/1989 | Bergeron .................... | 280/79.5 |
| 5,131,670 A | 7/1992 | Clements et al. | |
| 5,180,179 A | 1/1993 | Salvucci | |
| 5,752,543 A | * 5/1998 | Groening ................... | 280/79.5 |
| 5,806,867 A | 9/1998 | Hampton | |
| 5,890,254 A | * 4/1999 | Courtney et al. ............. | 16/422 |

* cited by examiner

Primary Examiner—Avraham Lerner
(74) Attorney, Agent, or Firm—Laurence A. Greenberg; Werner H. Stemer; Ralph E. Locher

(57) ABSTRACT

A method and a device for transporting a container capable of storing a pressurized substance and having a threaded fitting. The method and device enables a person to easily transport the container while being exposed to a minimal risk of injury. The device includes a grasping member with a threaded portion adapted to mate with the threaded fitting of the container and can include a handle that is remote from the threaded portion. The device can also include a roller having a connector for attachment to the container. The method includes steps of mating the threaded portion of the grasping member to the threaded fitting of the container to attach the grasping member to the container, and attaching the roller to the container. A person can apply a force to the grasping member, preferably through the handle, to roll the container on the roller from one location to another location.

17 Claims, 5 Drawing Sheets

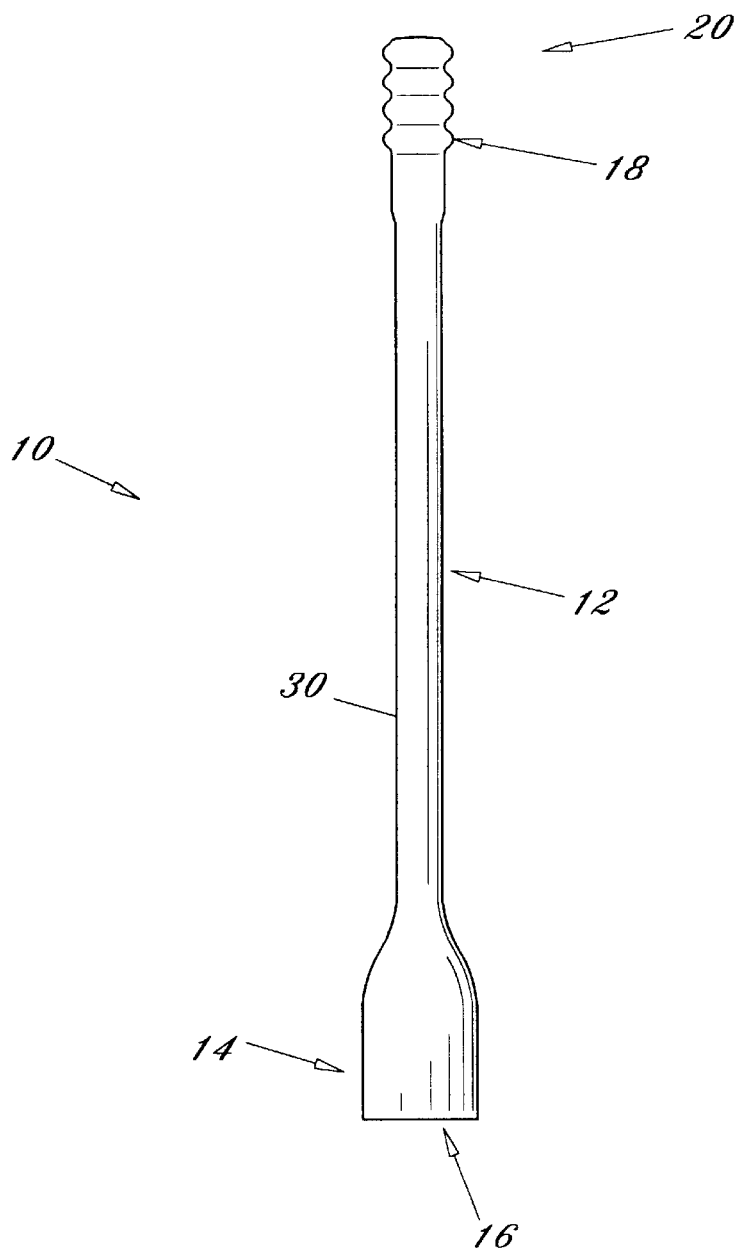
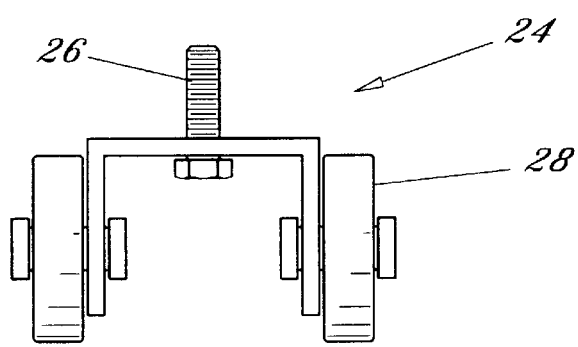
FIG. 2

METHOD AND DEVICE FOR TRANSPORTING A CONTAINER HAVING A THREADED FITTING

BACKGROUND OF THE INVENTION

1. Field of the Invention

The invention relates, in general, to a method and a device for transporting containers which have been provided with a threaded fitting. Such containers are typically provided with a valve and are capable of storing pressurized substances.

Containers capable of storing pressurized substances can be quite heavy, especially when full. A person will typically move such containers between a storage location and a transport vehicle or between different locations in a manner that requires manual lifting of the containers. This requires the expenditure of a large amount of time and effort by a person when moving such containers. Of greater concern is the fact that, because of the weight of these containers, the person is susceptible to injury in the process.

2. Summary of the Invention

It is accordingly an object of the invention to provide a method and a device for transporting a container having a threaded fitting, which overcomes the above-mentioned disadvantages of the heretofore-known devices and methods of this general type and which enables a person to easily transport the container while being exposed to a minimal risk of injury.

With the foregoing and other objects in view there is provided, in accordance with the invention, in combination with a container having a threaded fitting, an apparatus for moving the container, that includes a grasping member having a threaded portion adapted to mate with the threaded fitting of the container.

In accordance with an added feature of the invention, the apparatus includes a roller having a connector for attachment to the container.

In accordance with an additional feature of the invention, the roller is at least one wheel.

In accordance with an another feature of the invention, the grasping member includes a handle remote from the threaded portion.

In accordance with a further feature of the invention, the grasping member includes a rod.

In accordance with a further added feature of the invention, the rod has an end adjacent the threaded portion.

In accordance with a further additional feature of the invention, the rod has an end with an internal surface and the threaded portion is formed on the internal surface.

With the foregoing and other objects in view there is provided, in accordance with the invention, a method of moving a container having a threaded fitting, that includes the steps of: providing a container having a threaded fitting; attaching a roller to the container; providing a grasping member having a threaded portion; mating the threaded portion of the grasping member with the threaded fitting to attach the grasping member to the container; and applying a force to the grasping member to roll the container on the roller.

In accordance with an added mode of the invention, the method includes providing the grasping member with a handle remote from the threaded portion, and performing the step of applying a force to the grasping member by applying the force to the handle.

In accordance with an additional mode of the invention, the method includes providing the grasping member as a rod with an end adjacent the threaded portion.

In accordance with another mode of the invention, the method includes providing the grasping member as a rigid member.

In accordance with a further mode of the invention, the roller is provided as at least one wheel.

In accordance with a further added mode of the invention, the method includes the steps of: providing the grasping member with an end having an internal surface; forming the threaded portion on the internal surface of the grasping member; providing the grasping member with a handle remote from the end; and performing the step of applying a force to the grasping member by applying the force to the handle.

In accordance with a further additional mode of the invention, the method includes providing the container with a valve communicating with the threaded fitting.

With the foregoing and other objects in view there is provided, in accordance with the invention, a container moving kit having component parts capable of being assembled such that a force can be applied to move a container having a threaded fitting, the kit including the combination of: a grasping member having a threaded portion adapted to be mated with the threaded fitting of the container; and a roller having a connector adapted to be attached to the container.

In accordance with an added feature of the invention, the grasping member of the container moving kit includes a handle remote from the threaded portion.

In accordance with an additional feature of the invention, the grasping member of the container moving kit has an end adjacent the threaded portion.

Other features which are considered as characteristic for the invention are set forth in the appended claims.

Although the invention is illustrated and described herein as embodied in a method and a device for transporting a container having a threaded fitting, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF DESCRIPTION OF THE DRAWINGS

FIG. 2 is a side view of an apparatus for moving the container;

FIG. 4 is perspective view showing an internal surface of a rod;

DESCRIPTION OF THE PREFERRED EMBODIMENTS

Figure 1:
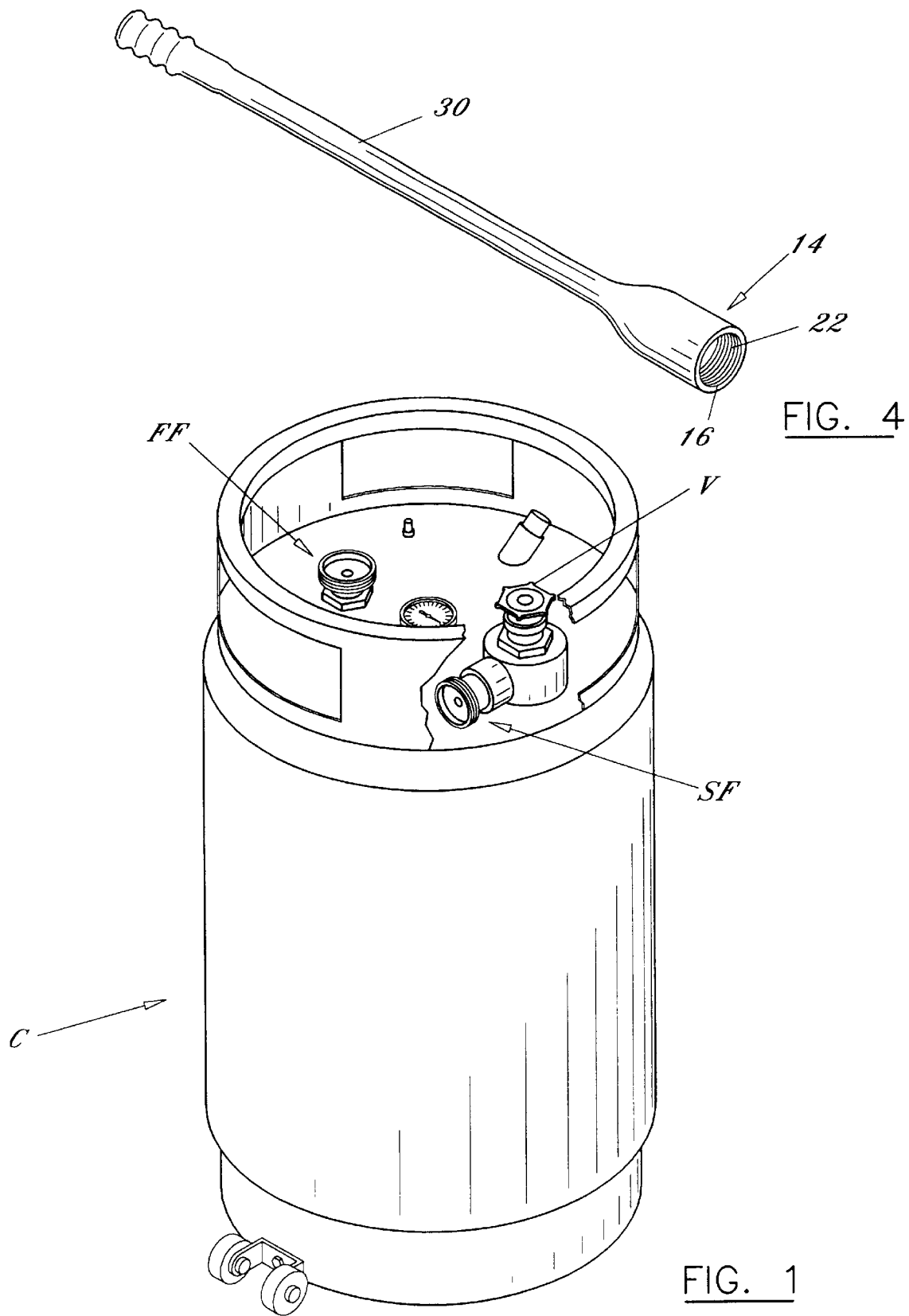
FIG. 1 is a perspective view of a container showing a threaded fitting.

Referring now to the figures of the drawing in detail and first, particularly, to FIG. 1 thereof, there is seen a well-known commercially available container C that is capable of storing pressurized substances. Such substances include gases that may turn into a liquid state when subjected to sufficient pressure. The container includes a threaded filler fitting FF communicating with a valve (not shown) that allows the container C to be filled with the substance and that prevents the substance from escaping from the container C. The container also includes a threaded supply fitting SF that communicates with a hand valve V for controlling dispensing of the pressurized substance from the container C. Typically, the threads of the threaded fittings FF and SF are provided on an external surface of the fittings FF and SF. Although not necessary, it is customary to provide the threaded fittings FF and SF on the top of the container C. Other well-known containers include only a single fitting that communicates with a valve. The present invention is intended for use with commercially available containers such that no modification of the container is necessary. However, as will become apparent after considering the invention disclosed herein, such commercially available containers could be modified to include an additional threaded fitting that does not communicate with a valve or with the interior of the container. The sole purpose of the additional fitting would be to cooperate with the present invention to enable a person to safely and easily transport the container.

Referring to FIG. 2, there is seen an apparatus or a kit 10 of component parts that enables the container C to be moved by a person. The apparatus 10 includes a grasping member 12 having a threaded portion 16 adapted to securely mate with a threaded fitting FF or SF of the container C. The threaded portion 16 can be better seen from the view given in FIG. 4. The grasping member 12 could be formed in various shapes and the threaded portion 16 could be connected or formed at one of a number a locations along the length of the grasping member 12. FIG. 2 shows a first preferred embodiment of the grasping member 12 which is a rod 30 that has a first end 14 adjacent the threaded portion 16. It is preferable to design the grasping member 12 such that the threaded portion 16 securely mates with the filler fitting FF because that fitting is in an upright position and is located in an easily accessible location on the commercially available container C. The grasping member 12 can include a handle portion 20 that is remote from the threaded portion 16. The first preferred embodiment of the grasping member 12, which is a rod 30, has a second end 18 that is remote from the first end 14, and in that case, the handle portion 20 could be adjacent the second end 18. The rod 30 is substantially rigid and can be constructed from metal, however the rod 30 is preferably formed by an injection molding process using a suitable plastic material that provides sufficient strength to move the container C. Suitable plastic materials should now be apparent to those of ordinary skill in the art and a detailed discussion of these materials is deemed to be not necessary. The rod 30 is preferably formed having a stress-point that is less than the stress-point of the filler fitting FF of the container C. This is done to prevent damage to the container C in the event that the rod 30 is dropped while it is mated with the filler fitting FF. If the stress-point of the rod 30 were greater than that of the filler fitting FF and the rod 30 were dropped while mated to the filler fitting FF, force from a surface could be transferred along the rod 30 to the filler fitting FF and the filler fitting FF could break, thereby damaging the container C. By designing the rod 30 with a stress or fracture-point that is less than that of the filler fitting FF, the rod 30 will break before enough force is transferred to the filler fitting FF to damage the container C.

Figure 3:
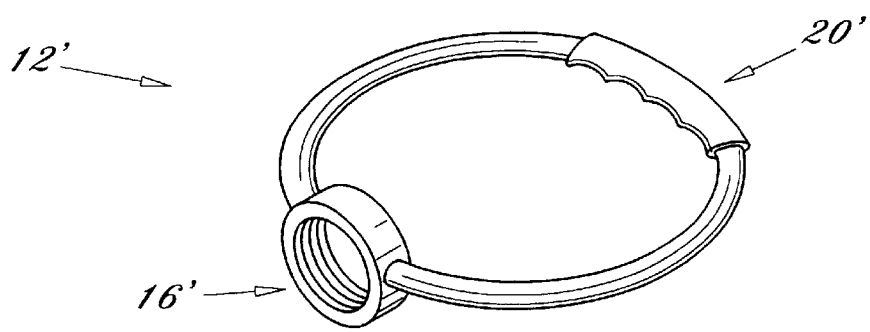
FIG. 3 is a perspective view of a second preferred embodiment of a grasping member.

The grasping member 12 could have a curved shape. For example, FIG. 3 shows a second preferred embodiment of the grasping member 12' that has a ring shape and a threaded portion 16'. The second embodiment of the grasping member 12' could have a handle portion 20' that is remote from the threaded portion 16'.

Referring to FIG. 4, it is seen that the first end 14 of the rod 30 preferably has an internal surface 22 and that the threaded portion 16 can be formed on the internal surface 22. This enables the threaded portion 16 of the rod 30 to mate with the threaded fitting FF or SF of the commercially available container C. It will now be apparent that one could provide a container having a fitting with threads constructed on the internal surface of the fitting. In that case, the threaded portion of the rod 30 would correspondingly be provided on an external surface of the first end 14 of the rod 30 such that the threads of the rod 30 could mate with the threads of the fitting of the container.

Referring again to FIG. 2, it is seen that the apparatus or kit 10 of component parts can also include a roller 24 that has a connector 26 for attaching the roller 24 to the container C. The roller 24 can be any well-known device, for example, one or more wheels 28 that could be attached to the container C and which would allow the container C to roll. One example of a connector 26 is a simple bolt attached to a bracket.

Figure 5:
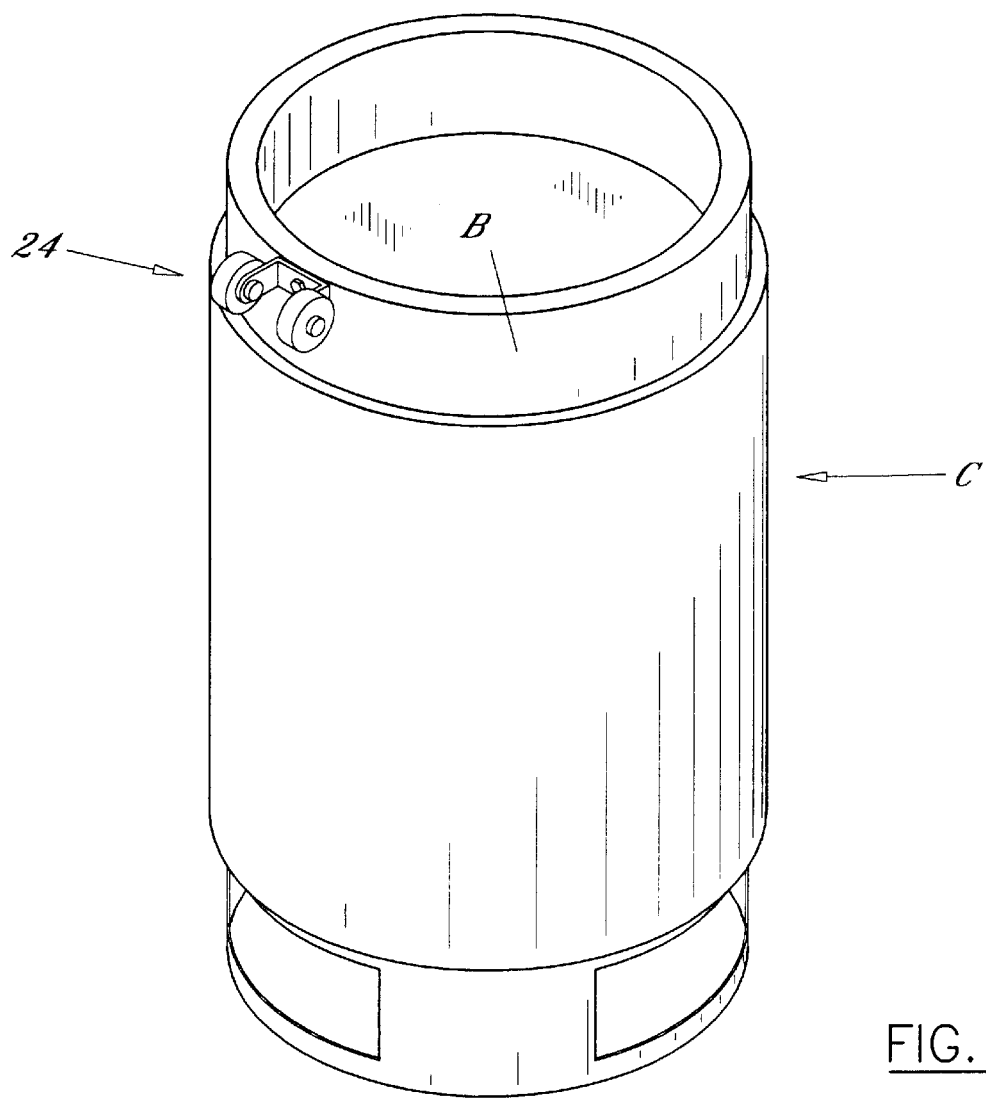
FIG. 5 is a perspective view showing the bottom of the container with a roller attached thereto.

Referring to FIG. 5, it can be seen that a hole has been produced through a bottom edge portion B of the container C, and that the roller 24 has been attached to the container C by the bolt and a nut. It should be understood that this is but one example of attaching the roller 24 to the container C. For another example, a carriage could be used to attach the roller 24 to the container, and it should now be apparent to one of ordinary skill in the art that many other attachment mechanisms could be used.

The container C could be provided with the roller 24 during manufacturing of the container C such that the commercially available container C need only be provided with the grasping member 12 to enable a person to move the container C. In that case, only the grasping member 12 would need to be provided separately. Alternatively, the roller 24 could be marketed separately from the grasping member 12. In a preferred embodiment, the grasping member 12 and the roller 24 would be provided as component parts of a kit 10 that could be assembled to enable a person to move the container C.

Figure 6:
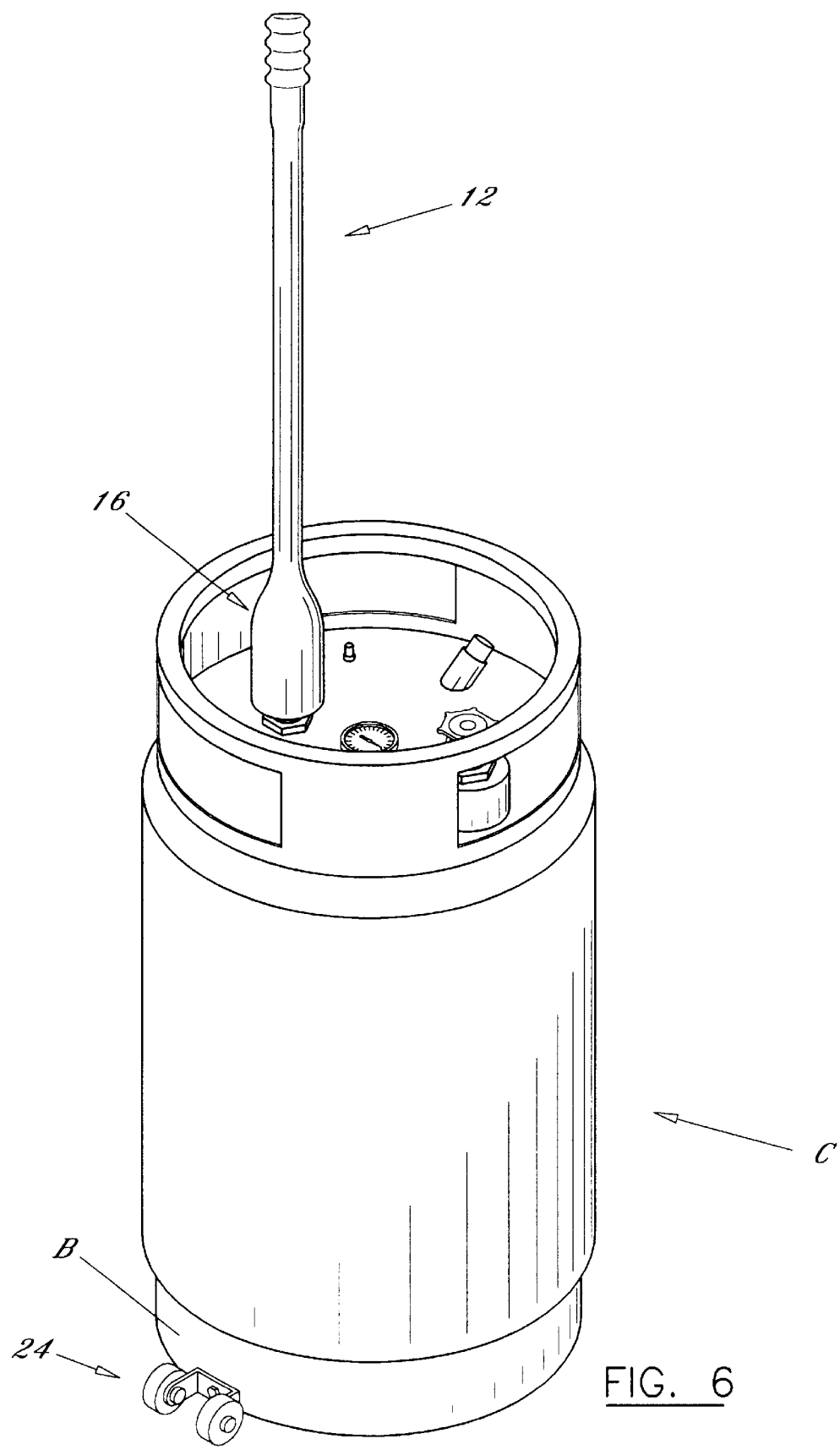
FIG. 6 is a perspective view of the container showing the rod securely mated with a threaded fitting of the container.

Referring to FIG. 6, it can be seen that the grasping member 12 has been attached to the container C by securely mating the threaded portion 16 of the grasping member 12 to the threaded fitting FF of the container C. The roller 24 can be seen attached to the bottom edge portion B of the container C, as discussed with reference to FIG. 5.

Figure 7:
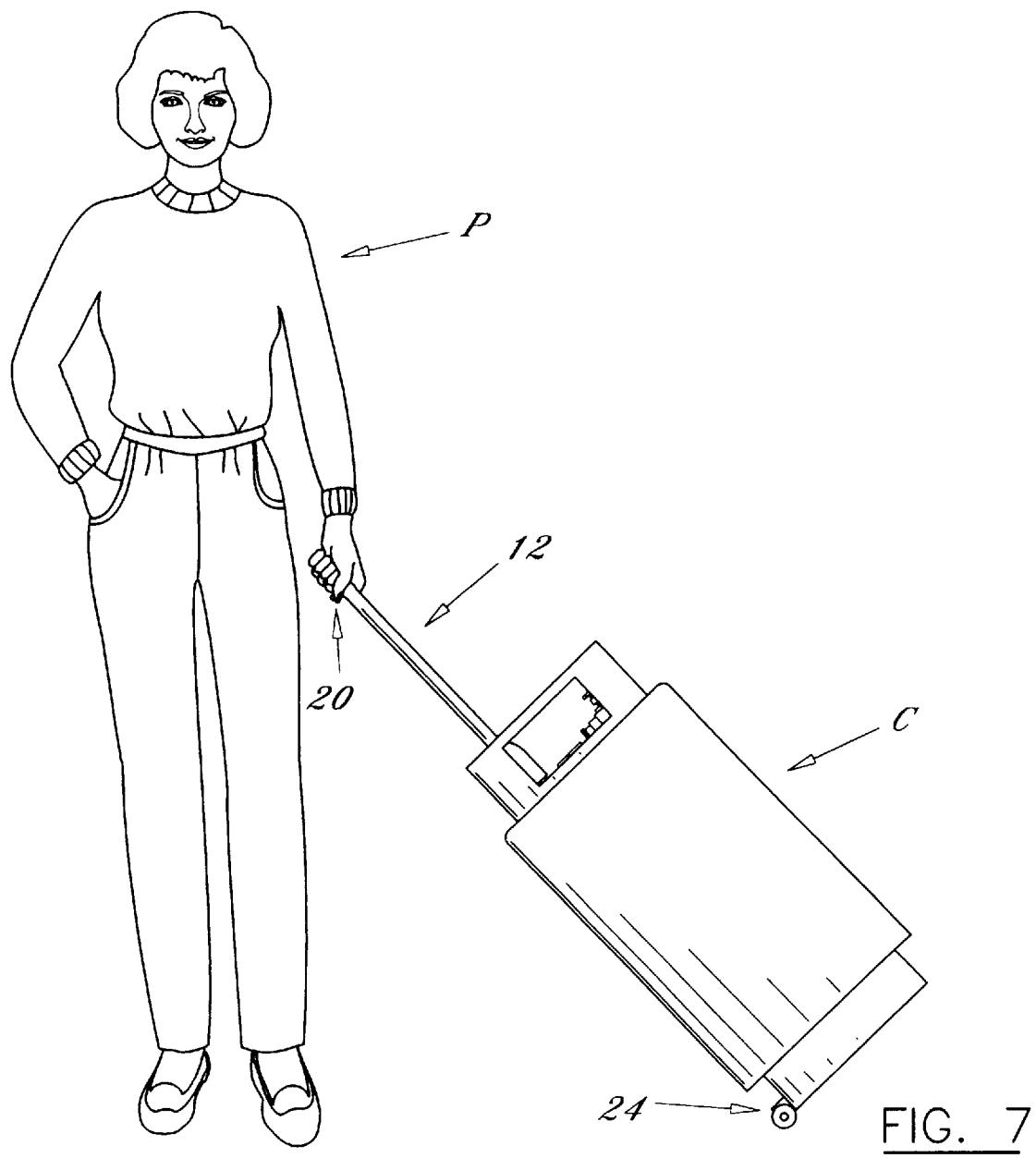
FIG. 7 shows the container attached to the roller and to the rod and positioned for transport by a person.

Referring to FIG. 7, it can be seen that the roller 24 and the grasping member 12 have been attached to the container C. As shown, a person can grasp the grasping member 12, preferably by the handle portion 20, and can apply a force to tilt the container C such that the container C only makes contact with the floor or other surface through the roller 24. The person can now apply a force to the grasping member 12, preferably through the handle portion 20, such that the container will roll on the roller 24. The applied force can be in either direction so that the container can be pulled or pushed on the roller 24 from one location to another location.

I claim:

1. In combination with a container having a valve and a threaded fitting communicating with the valve, an apparatus for moving the container, the threaded fitting having threads, the apparatus comprising:
   a rolling device connected to the container; and
   a grasping member for rolling the container on said rolling device;
   said grasping member having a threaded portion adapted to be screwed onto the threads of the threaded fitting of the container said grasping member including a rod.

2. The apparatus according to claim 1, wherein said rolling device includes at least one wheel.

3. The apparatus according to claim 1, wherein said grasping member includes a handle remote from said threaded portion.

4. The apparatus according to claim 1, wherein said rod has an end adjacent said threaded portion.

5. The apparatus according to claim 3, wherein said rod has an end with an internal surface and said threaded portion is formed on said internal surface.

6. The apparatus according to claim 1, wherein said grasping member is formed having a stress-point that is less than a stress-point of the threaded fitting of the container.

7. A method of moving a container having a threaded fitting, which comprises:
   providing a container having a valve and a threaded fitting communicating with the valve, the threaded fitting having threads;
   attaching a roller to the container;
   providing a grasping member including a rod having a threaded portion;
   screwing the threaded portion of the grasping member onto the threads of the threaded fitting to attach the grasping member to the container; and
   applying a force to the grasping member to roll the container on the roller.

8. The method according to claim 7, which comprises providing the grasping member with a handle remote from the threaded portion, and performing the step of applying a force to the grasping member by applying the force to the handle.

9. The method according to claim 7, wherein the grasping member is rigid.

10. The method according to claim 7, wherein the roller is at least one wheel.

11. The method according to claim 7, which comprises:
    providing the grasping member with an end having an internal surface;
    forming the threaded portion on the internal surface of the grasping member;
    providing the grasping member with a handle remote from the end; and
    performing the step of applying a force to the grasping member by applying the force to the handle.

12. The method according to claim 7, which comprises providing the threaded fitting of the container with a stress-point, and forming said grasping member to have a stress-point that is less than the stress-point of the threaded fitting of the container.

13. A container moving kit having component parts capable of being assembled such that a force can be applied to move a container having a valve and a threaded fitting communicating with the valve, the threaded fitting having threads, the kit comprising the combination of:
    a grasping member including a rod having a threaded portion adapted to be screwed onto the threads of the threaded fitting that communicates with the valve of the container; and
    a roller having a connector adapted to be attached to the container.

14. The container moving kit according to claim 13, wherein said grasping member includes a handle remote from said threaded portion.

15. The container moving kit according to claim 14, wherein said grasping member has an end adjacent said threaded portion.

16. The container moving kit according to claim 13, wherein said grasping member is formed having a stress-point that is less than a stress-point of the threaded fitting of the container.

17. In combination with a container having a valve and a threaded fitting communicating with the valve, an apparatus for moving the container, the threaded fitting having threads, the apparatus comprising: a rolling device connected to the container; and a rod for rolling the container on said rolling device, said rod having a threaded portion adapted to be screwed onto the threads of the threaded fitting of the container.

* * * * *

UNITED STATES PATENT AND TRADEMARK OFFICE
CERTIFICATE OF CORRECTION

PATENT NO. : 6,708,990 B1
DATED : March 23, 2004
INVENTOR(S) : Robert Siano

It is certified that error appears in the above-identified patent and that said Letters Patent is hereby corrected as shown below:

<u>Title page,</u>
Item [76], Inventors, should read as follows:
-- Robert Siano, 1901 N.W. 2$^{nd}$ St., Fort Lauderdale, FL 33101 (US) --

Signed and Sealed this

Twenty-fifth Day of May, 2004

JON W. DUDAS
*Acting Director of the United States Patent and Trademark Office*